United States Patent
Byeon (10) Patent No.: US 7,843,758 B2
(45) Date of Patent: Nov. 30, 2010

(54) MULTI-CHIP PACKAGE FLASH MEMORY DEVICE AND METHOD FOR READING STATUS DATA THEREFROM

(75) Inventor: Dae-Seok Byeon, Yongin-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 193 days.

(21) Appl. No.: 11/984,595

(22) Filed: Nov. 20, 2007

(65) Prior Publication Data

US 2008/0117682 A1    May 22, 2008

(30) Foreign Application Priority Data

Nov. 21, 2006    (KR)    ............. 10-2006-0115387

(51) Int. Cl.
*G11C 8/00*    (2006.01)
(52) U.S. Cl. ............. 365/230.05; 365/52; 365/185.11; 365/230.03
(58) Field of Classification Search ............ 365/185.03, 365/185.11, 185.18, 53, 61, 189.08, 189.17, 365/189.18, 220, 230.05, 52
See application file for complete search history.

(56) References Cited

U.S. PATENT DOCUMENTS

| | | | | |
|---|---|---|---|---|
| 5,303,201 | A | * | 4/1994 | Sakamoto ............. 365/236 |
| 5,982,664 | A | * | 11/1999 | Watanabe ............. 365/185.11 |
| 6,680,858 | B2 | | 1/2004 | Nakamura et al. |
| 6,798,696 | B2 | * | 9/2004 | Matsushita et al. ..... 365/185.11 |
| 6,834,322 | B2 | | 12/2004 | Sukegawa |
| 6,888,733 | B2 | | 5/2005 | Jang et al. |
| 2002/0073272 | A1 | * | 6/2002 | Ko et al. ............. 711/103 |
| 2004/0057297 | A1 | | 3/2004 | Jang et al. |
| 2007/0279988 | A1 | * | 12/2007 | Nguyen ............. 365/185.18 |
| 2008/0082730 | A1 | * | 4/2008 | Kim et al. ............. 711/103 |
| 2008/0298157 | A1 | * | 12/2008 | Chung ............. 365/227 |

FOREIGN PATENT DOCUMENTS

| | | |
|---|---|---|
| JP | 2001-167586 | 6/2001 |
| JP | 2004-046854 | 2/2004 |
| JP | 2006-139916 | 6/2006 |
| KR | 10-0411849 | 12/2003 |
| KR | 10-0442091 | 7/2004 |
| KR | 10-0538728 | 12/2005 |

OTHER PUBLICATIONS

S. Burman et al., "Programmable Multichip Modules," *IEEE Micro*, pp. 28-35, (Apr. 1993).

* cited by examiner

*Primary Examiner*—Vu A. Le
*Assistant Examiner*—Han Yang
(74) *Attorney, Agent, or Firm*—Harness, Dickey & Pierce, P.L.C.

(57) ABSTRACT

A method for reading status data from a multi-chip memory device including pluralities of memory chips is comprised of: providing a command to request an output of the status data to the plurality of memory chips; and accepting the status data of the plurality of memory chips through multiple channels of the multi-chip memory device. The reading method of the status data is helpful to shortening a standby time for accepting the status data of the multi-chip memory device, enhancing an operation rate.

10 Claims, 7 Drawing Sheets

| Chip<br>I/O<x> | Chip1 | Chip2 | Chip3 | Chip4 | Chip5 | Chip6 | Chip7 | Chip8 |
|---|---|---|---|---|---|---|---|---|
| I/O<0> | RnB | Hi-Z | Hi-Z | Hi-Z | Hi-Z | Hi-Z | Hi-Z | Hi-Z |
| I/O<1> | Hi-Z | RnB | Hi-Z | Hi-Z | Hi-Z | Hi-Z | Hi-Z | Hi-Z |
| I/O<2> | Hi-Z | Hi-Z | RnB | Hi-Z | Hi-Z | Hi-Z | Hi-Z | Hi-Z |
| I/O<3> | Hi-Z | Hi-Z | Hi-Z | RnB | Hi-Z | Hi-Z | Hi-Z | Hi-Z |
| I/O<4> | Hi-Z | Hi-Z | Hi-Z | Hi-Z | RnB | Hi-Z | Hi-Z | Hi-Z |
| I/O<5> | Hi-Z | Hi-Z | Hi-Z | Hi-Z | Hi-Z | RnB | Hi-Z | Hi-Z |
| I/O<6> | Hi-Z | Hi-Z | Hi-Z | Hi-Z | Hi-Z | Hi-Z | RnB | Hi-Z |
| I/O<7> | Hi-Z | Hi-Z | Hi-Z | Hi-Z | Hi-Z | Hi-Z | Hi-Z | RnB |

Fig. 7

MULTI-CHIP PACKAGE FLASH MEMORY DEVICE AND METHOD FOR READING STATUS DATA THEREFROM

PRIORITY STATEMENT

This U.S. non-provisional patent application claims priority under 35 U.S.C. §119 of Korean Patent Application No. 2006-115387 filed on Nov. 21, 2006, the entire contents of which are hereby incorporated by reference.

BACKGROUND

Example embodiments disclosed herein relates to flash memory devices and more particularly, to a multi-chip flash memory device and method for reading status data therefrom.

In recent years, the application fields for volatile and non-volatile memories have been spreading rapidly over mobile apparatuses such as MP3 players, personal multimedia players (PMP), mobile phones, notebook computers, personal digital assistants (PDA), and so on. Those mobile apparatuses may require storage units with great storage capacity in order to provide for various functions (e.g., playing motion pictures). Thus, there have been many studies related to these requirements, some of which are ongoing even today. One of those efforts involves a scheme of multi-chip package in which pluralities of memory devices may be constructed in a single package. The multi-chip package may be useful for reducing the package size for a given memory capacity remarkably by stacking memory chips of the same kind on a board. Generally, a plurality of memory chips included in a multi-chip package may share an input/output bus and control pins. But, the memory chips may be able to independently conduct their own programming or erasing operations. For those operations, there may be a need for a memory controller to manage the memory chips individually and enable an external system or host to identify them as a single device.

Recent flash memory devices may embed memory controllers for conducting the sequences of programming and erasing operations therein. In those flash memory devices, when commands and program data are input from external systems, series of operations may be automatically carried out until programming operations, including writing and verifying operations with data, are complete. In the programming and erasing operations, a ready/busy signal (Rn/B) may be output from the beginning to the end of operation, inhibiting an access to the memory. But, in a multi-chip flash memory device where pluralities of flash memory chips are embedded in a single package, all of the memory chips may not be fully engaged in a programming or erasing operation at the same time. Therefore, the memory chips may provide the ready/busy signals to an external host at different points in response to commands identified each by the memory chips. In other words, the ready/busy signals of the memory chips may be output in time-divisional mode by the commands provided in time-divisional mode. Generally, the memory chips output the ready/busy signals to input/output (I/O) pins that may be used as input/output terminals.

Figure 1:
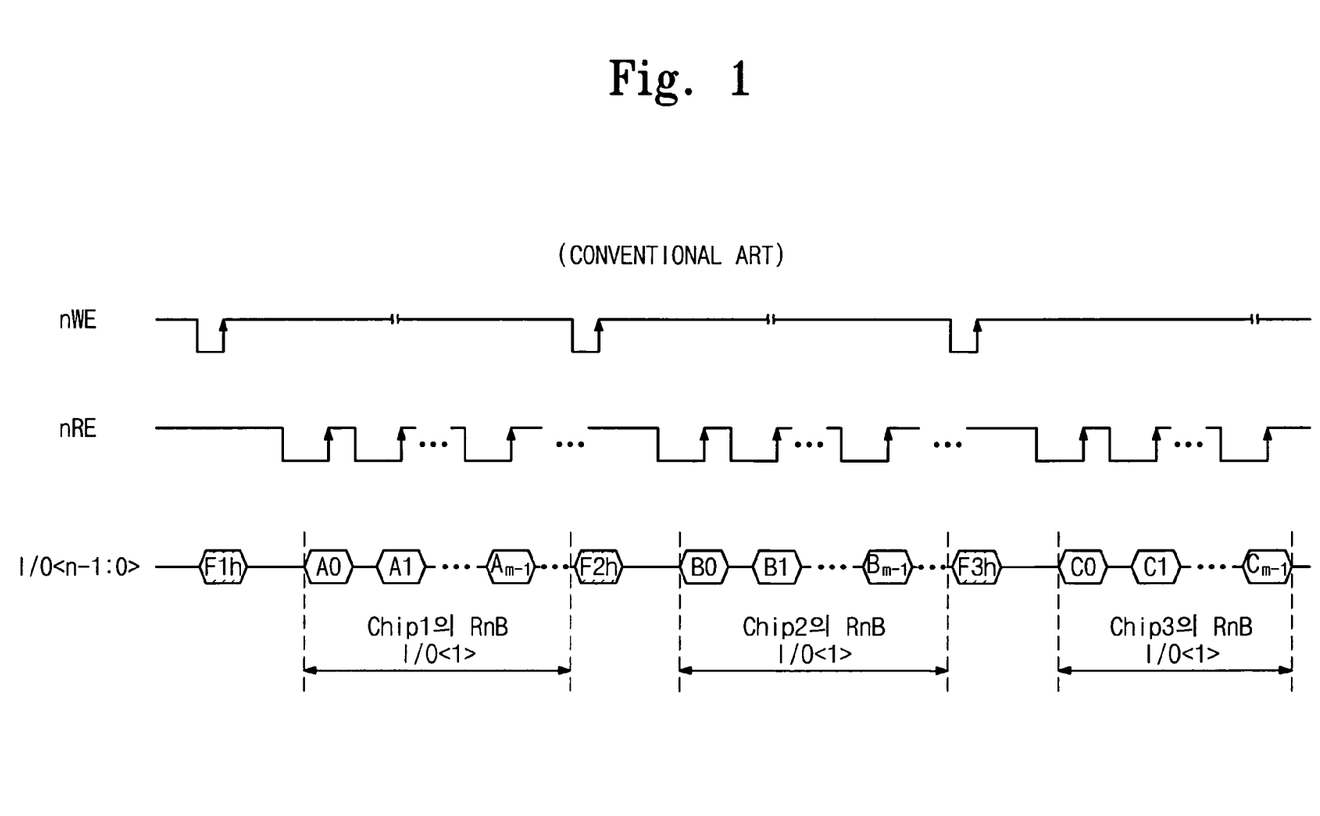
FIG. 1 is a timing diagram briefly showing an output pattern of ready/busy signals in a conventional multi-chip flash memory device.

FIG. 1 is a timing diagram briefly showing an output pattern of ready/busy signals Rn/B in a general multi-chip flash memory device. Referring to FIG. 1, the general multi-chip flash memory device outputs the ready/busy signals Rn/B in the time-divisional mode as aforementioned. Commands for outputting the ready/busy signals Rn/B are provided to each of the memory chips in different points.

If storing a large capacity of data, the multi-chip flash memory device may operate in the interleaved mode in which all of the memory chips continuously conduct programming operations with data provided thereto. In this case, a host or memory controller may frequently request the ready/busy signals Rn/B from each of the memory chips in order to check on states of the programming operations. In such a general multi-chip flash memory device outputting the ready/busy signals Rn/B in the time-divisional mode, those frequent requests may be provided with commands that are exclusively identified by each of the memory chips. Namely, the commands for requesting the ready/busy signals may be assigned such that one memory chip identifies a command requesting the ready/busy signal Rn/B while other memory chips cannot identify the command. The host or memory controller may provide the memory chips with the commands for requesting the ready/busy signals Rn/B and then may receive the ready/busy signal Rn/B for predetermined clock cycles. If there is a need to request the ready/busy signals Rn/B from all of the memory chips, these operations may be carried out independently on the memory chips. Then, after inputting the commands to the memory chips and confirming conditions of the ready/busy signals Rn/B output from each of the memory chips, the host or memory controller may terminate the status check operations if the memory chips. If the status check operations for the ready/busy conditions of the memory chips are terminated, the host (or memory controller) may select a memory chip to be programmed and provide program data (i.e., data to be programmed) to the selected memory chip. According to an output pattern of the ready/busy signals Rn/B by the time-divisional mode, the ready/busy signal Rn/B may be assigned to a data bit output through one of input/output pins I/O<n−1:0> which are controlled by toggling operations of a output-enable (or read-enable) signal nRE. For instance, I/O<1> among n-bit data output in a one clock cycle may be assigned to the ready/busy signal Rn/B. Therefore, in order to provide the ready/busy status of all memory chips to the host, the host or memory controller may be required to apply respective commands to each of the memory chips at different points and obtain the ready/busy signals Rn/B at different points. However, for a programming operation with a large amount of data (i.e., an interleaved programming operation in the multi-chip flash memory device), the host or memory controller may need to frequently request the ready/busy signals Rn/B from all of the memory chips included in the multi-chip flash memory device. Those frequent requests and outputs with the ready/busy signals Rn/B may consume a significant amount of time. Further, if it is impossible to find an internal operation state of a memory chip in a short time, a fast interleaved programming operation may be more difficult to accomplish. A longer standby time for confirming the ready/busy signals Rn/B of the multi-chip flash memory device may degrade the operation rate of the memory system.

Techniques for controlling outputs of the ready/busy signals Rn/B in the multi-chip flash memory device are disclosed in related art. But, the related art does not suggest an art capable of shortening a standby time for the ready/busy signals Rn/B provided from each of a plurality of memory chips. Reducing the output standby time of the ready/busy signals Rn/B may improve the efficiency and data rate of the interleaved operation in the multi-chip flash memory device.

SUMMARY

Example embodiments are directed to providing a shortened time for outputting (or reading) status data from a multi-chip memory device.

At least one example embodiment is directed to a method of reading status data from a multi-chip memory device comprising a plurality of memory chips, including: providing a command to request an output of the status data from each of the plurality memory chips; and accepting the status data of each of the plurality memory chips through different channels of the multi-chip memory device.

In at least one example embodiment, the plurality of memory chips may share the channels of the multi-chip memory device.

In at least one example embodiment, the plurality of memory chips may output the status data through multiple channels in parallel.

In at least one example embodiment, the status data may be ready/busy signals.

In at least one example embodiment, each of the plurality of memory chips may output the status data in parallel.

In at least one example embodiment, the plurality of memory chips output the status data through input/output pins that may be electrically connected to the channels.

In at least one example embodiment, while accepting the status data of the plurality of memory chips through the different channels of the multi-chip memory device, the status data may be output in sync with an output-enable signal.

In at least one example embodiment, the channels may be an internal data bus of the multi-chip memory device.

According to example embodiments, a method for reading status data from a multi-chip memory device including pluralities of memory chips may also comprise: setting status data of the plurality of memory chips to be output through different channels of the multi-chip memory device; providing a command to request an output of the status data from the plurality of memory chips; and accepting the status data through the different channels at the same time.

In at least one example embodiment, while setting status data of the plurality of memory chips to be output through different channels of the multi-chip memory device, the channels through which the status data are output may be selected by bonding options.

In at least one example embodiment, while setting status data of the plurality of memory chips to be output through different channels of the multi-chip memory device, the channels through which the status data are output may be selected by fuse programming.

At least one example embodiment is directed to a multi-chip memory device which may include: bus lines; a memory controller electrically connected to the bus lines; and pluralities of memory chips in which the bus lines are each electrically connected to input/output pins which may output status signals to different lines of the bus lines in response to a status request signal.

In at least one example embodiment, the status request command is provided to the plurality of memory chips through the bus lines.

In at least one example embodiment, each memory chip may include: a controller for generating the status signal in response to the status request command; an output buffer for storing the status signal in real time; and a means configured to provide pin assignment information for designating the input/output pin from which the status signal is output to the output buffer. The pin assignment information may enable the memory chips to output the status signals to different input/output pins.

In at least one example embodiment, the means providing the pin assignment information is set by fuse programming.

In at least one example embodiment, the means providing the pin assignment information is set by bonding options of each memory chip.

In at least one example embodiment, the controllers included in the plurality of memory chips each output the status signals in response to the status request command at the same time.

In at least one example embodiment, the controllers included in the plurality of memory chips output the status signals through the different input/output pins.

In at least one example embodiment, the status signals output through the different input/output pins are provided to the memory controller by way of the bus lines.

In at least one example embodiment, the status signal may be a ready/busy signal.

In at least one example embodiment, the plurality of memory chips may be flash memory devices.

In the multi-chip flash memory device, one-time command provision makes it possible to read the ready/busy status of all memory chips at the same time. Hence, it shortens a time for confirming the ready/busy status, improving an operation rate of the multi-chip flash memory device.

A further understanding of the nature and advantages of example embodiments herein may be realized by referencing the remaining portions of the specification and the attached drawings.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

Non-limiting and non-exhaustive example embodiments will be described with reference to the following figures, wherein like reference numerals refer to like parts throughout the various figures unless otherwise specified. In the figures.

DESCRIPTION OF EXAMPLE EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Example embodiments will be described below in more detail with reference to the accompanying drawings. Example embodiments may, however, be embodied in different forms and should not be construed as limited to the embodiments set forth herein. Rather, these embodiments are provided so that this disclosure will be thorough and complete, and will fully convey the scope of example embodiments to those skilled in the art. Like reference numerals refer to like elements throughout the accompanying figures.

Figure 2:
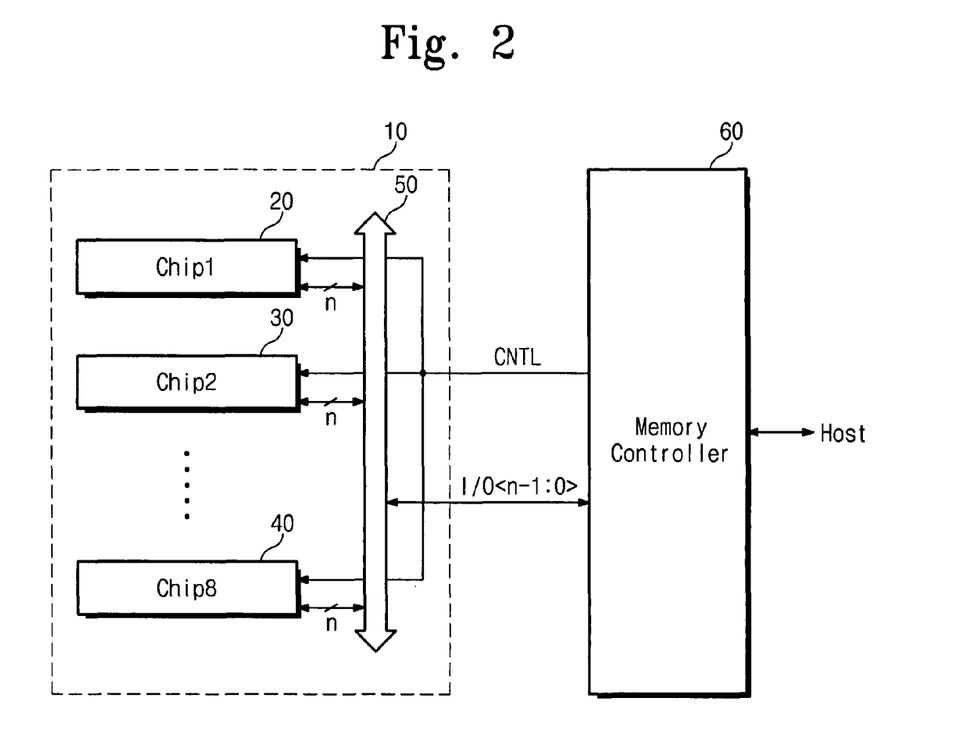
FIG. 2 is a block diagram showing a multi-chip flash memory device in accordance with the at least one example embodiment.

FIG. 2 is a block diagram showing a multi-chip flash memory device 10 in accordance with at least one example embodiment. Referring to FIG. 2, the multi-chip flash memory device is able to obtain the status of ready/busy signals Rn/B for all memory chips by inputting a command requesting the ready/busy signals Rn/B just once. For this, the multi-chip flash memory device 10 has an input/output bus 50 shared by the memory chips 20, 30, and 40 (20~40). The multi-chip flash memory device 10 may provide the ready/busy signals Rn/B of all the memory chips to a memory controller 60 or a host at the same time in response to a single command requesting the ready/busy signals Rn/B.

The memory chips 20~40 may all receive a status request command from a host or the memory controller 60 at the same time. Generally, the status request command, which may request an output of the ready/busy signal Rn/B, may be simultaneously applied to input buffers of the memory chips in sync with a control signal CNTL (e.g., a write-enable signal nWE). Responding to the status request command, the memory chips may simultaneously transfer their ready/busy status to input/output pins the I/O<x> exclusively assigned thereto. The memory chips may also send the ready/busy status to other different input/output pins allocated each thereto. Thus, even in the multi-chip memory device sharing the input/output bus 50, the ready/busy signals Rn/B from all of the memory chips may each be provided by detecting voltage levels from the input/output pins assigned thereto. Each memory chip may be provided with assignment information of the input/output pin I/O<x> that may be used for the ready/busy signal Rn/B. As illustrated in FIG. 2, one of the input/output pins (in number of n) of the first chip (Chip 1) 20 may be assigned to an output pin of its ready/busy signal Rn/B. In this case, the second chip (Chip 2) 30 may be required to output its ready/busy signal Rn/B through an input/output pin that is not assigned to the first chip 20 or other chips. Therefore, the memory chips 20~40 may each be exclusively assigned with the input/output pins for the ready/busy signals Rn/B.

The input/output bus 50 may be electrically connected to the input/output pins of the memory chips. Thus, the command requesting outputs of the ready/busy signals Rn/B may be applied to all the memory chips by way of the input/output bus 50 at the same time. Additionally, the ready/busy signals Rn/B, which may be output from the memory chips at the same time, may be transferred to the memory controller 60 through different lines of the input/output bus 50 in response to the command requesting outputs of the ready/busy signals Rn/B.

The memory controller 60 may select each of the memory chips 20~40 in response to a writing or erasing command provided from the host. The memory controller 60 may enable the multi-chip flash memory device 10 to program a cell array region of a selected memory chip data with data that is provided subsequent to the writing command. Here, while the memory controller 60 is illustrated as being independent from the multi-chip flash memory device 10 in structure, it may also be included in the multi-chip flash memory device 10.

According to at least one example embodiment, the multi-chip flash memory device is able to output the ready/busy signal Rn/B in a short time during an interleaved programming operation. The multi-chip flash memory device may encounter a situation that all the memory chips continue their programming operations in the condition of storing a large capacity of data. For these successive programming operations, the memory controller 60 may frequently apply the status request command of the ready/busy signals to multiple memory chips at the same time in order to determine the status of internal conditions of the multi-chip flash memory device 10. And, the memory controller 60 may be able to accept the ready/busy signals Rn/B from multiple memory chips simultaneously through different input/output pins. Thus, by determining current operation states of the memory chips in a short time, it may be possible to quickly supply program data to a memory chip ready to be written. This operational feature makes it permissible to remarkably shorten a standby time for confirming the status of the ready/busy signals Rn/B.

Figure 3:
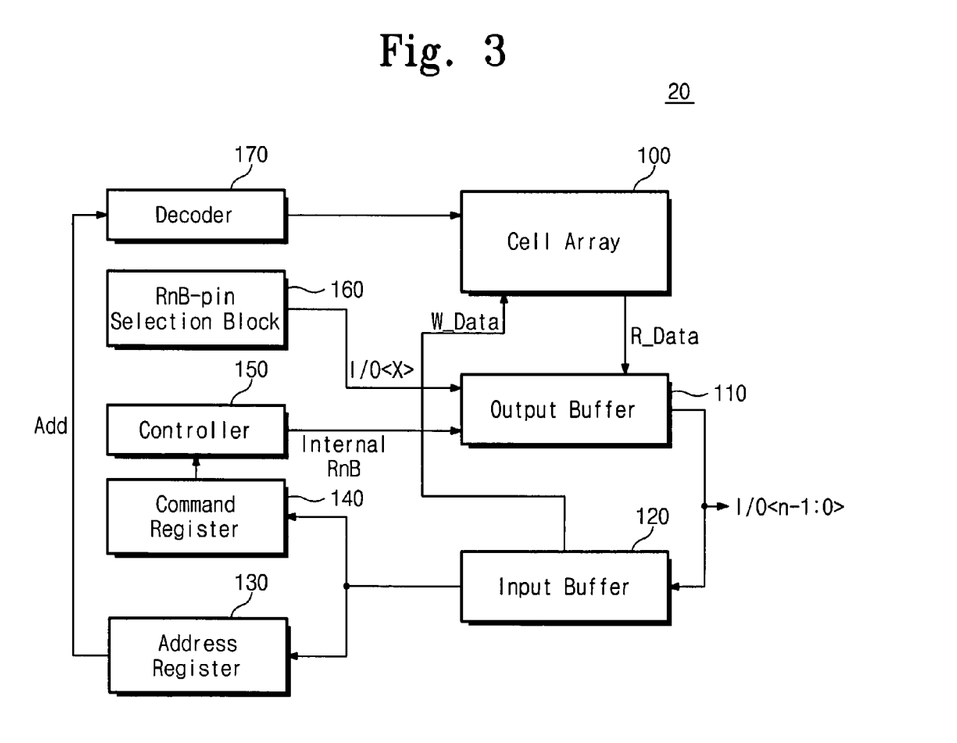
FIG. 3 is an example block diagram showing an internal structure of each memory chip shown FIG. 2.

FIG. 3 is a block diagram showing an internal structure of each memory chip shown FIG. 2. Referring to FIG. 3, each of the memory chips 20~40 included in the multi-chip flash memory device of the example embodiments may be provided with assignment information of the input/output pin I/O<x> for outputting the ready/busy signal Rn/B. The assignment information about the input/output pin I/O<x> is normally set by bonding or fusing option, but example embodiments need not share those restrictions.

A cell array 100 stores the program data W_Data that may be transferred from the memory controller 60. During a reading operation, the cell array 100 may output readout data R_Data from a memory region in response to an address that may be provided by the memory controller 60.

An output buffer 110 may output the readout data R_Data of the cell array 100 externally from the memory chip (e.g., 20) through the input/output pins I/O<n−1:0>. The output buffer 110 outputs an internal ready/busy signal INT_Rn/B, which is internally generated in the memory chip, to its particular input/output pin I/O<x> that is exclusively assigned to the memory chip 20. During this, the output buffer 110 may be provided with the assignment information of the input/output pin I/O<x> from an Rn/B-pin selection block 160. The output buffer 110 may store the internal ready/busy signal INT_Rn/B, which may be provided from a controller 150 during or after a programming operation of the memory chip 20, in real time. Namely, without the readout data R_Data in the output buffer 110, the output buffer 110 may store a logical value (high or low) of the internal ready/busy signal INT_Rn/B. The logical value of the internal ready/busy signal INT_Rn/B stored in the output buffer 110 may be output externally as the ready/busy signal Rn/B in response to the output-enable signal nRE.

An input buffer 120 may temporarily store input data provided to the chip 20. This input data may be a command, an address, or the program data W_Data. The input data may be supplied into chip elements corresponding thereto. An address register 130 may latch an address provided through the input buffer 120 and supply the address to a decoder 170. A command register 140 may receive a command from the input buffer 120 and transfer the command to the controller 150 so as to conduct an operation in compliance with the command.

The controller 150 may operate to control an internal operation of the memory chip in response to a command or control signal (not shown). In particular, the controller 150 may generate the internal ready/busy signal INT_Rn/B, during a programming or erasing operation. The internal ready/busy signal INT_Rn/B, which may be generated from the controller 150, may be provided externally through the output buffer 110, and may indicate that the memory chip 20 is busy performing a programming or erasing operation. This ready/busy signal Rn/B may be set in a register storing its logical value and the logical value stored in the register may be output to a ready/busy pin that may be prepared for the memory chip 20. But, for the purpose of low cost and operational convenience in the multi-chip flash memory device, pluralities of the ready/busy signals Rn/B from the plurality of memory chips may be output to the input/output pins. Therefore, the internal ready/busy signal INT_Rn/B generated from the controller 150 may be output externally through one of the plurality of input/output pins by way of the output buffer 110.

The Rn/B-pin selection block 160 may provide the output buffer 110 with the assignment information of the input/output pin I/O<x> from which the ready/busy signal Rn/B is output. If I/O<1> is assigned to the input/output pin to output the ready/busy signal Rn/B corresponding to the memory chip 20, the Rn/B-pin selection block 160 may provide the assignment information to the output buffer 110 so as to select the input/output pin I/O<1>. Here, the Rn/B-pin selection block 160 may be implemented by means of fuse programming scheme. Otherwise, the Rn/B-pin selection block 160 may be set by means of bonding option. But, there may be alternate methods for setting the Rn/B-pin selection block 160. For instance, the Rn/B-pin selection block 160 may also be implemented in a register set by configuration data provided from the host or memory controller 60 at a power-on time.

The decoder 170 may operate to decode an address, Add, which may be latched in the address register 130 and may provide a selection signal of the cell array 100.

As aforementioned, each of the memory chips 20~40 may be able to output the internal ready/busy status to different input/output pins at the same time in response to a command from the host or the memory controller 60. The command may be identified by all of the memory chips 20~40. Therefore, the one-time command input may enable all the memory chips of the multi-chip flash memory device to output their ready/busy status at the same time. In response to the one-time command input from the host or the memory controller 60, the multi-chip flash memory device according to at least one example embodiment may output the current status of programming or erasing operations in a short time.

Figure 4:
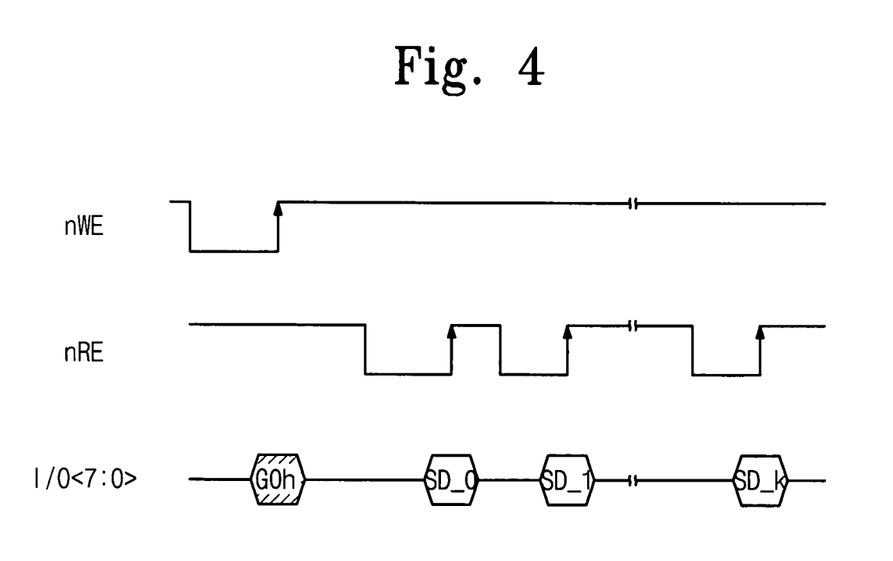
FIG. 4 is a timing diagram showing an output pattern of a ready/busy signal in the multi-chip flash memory device according to at least one example embodiment.

FIG. 4 is a timing diagram showing an output pattern of the ready/busy signal Rn/B in the multi-chip flash memory device according to at least one example embodiment. Referring to FIG. 4, in response to the one-time input command G0h, the multi-chip flash memory device, according to at least one example embodiment, may output the ready/busy signals Rn/B of all the memory chips 20~40, to each of the input/output pins assigned thereto, at the same time, In order to check the current status of a programming or erasing operation in each of the memory chips, the host or the memory controller 60 may input the status request command G0h, which may request the ready/busy signals Rn/B from the memory chips, to the multi-chip flash memory device in sync with the write-enable signal nWE. The status request command G0h may be simultaneously input to the memory chips 20~40 by way of the input/output bus 50. The controllers 150 which may be included in each of the memory chips 20~40 may identify the request command G0h of the ready/busy signals Rn/B. The controllers 150 respective to the memory chips 20~40 may provide the internal ready/busy signals Rn/B to their corresponding output buffers 110 with information about current operation conditions. The internal ready/busy signal Rn/B, which may be provided to the output buffer 110, may be transferred to the input/output pin I/O<x> assigned thereto, among the plurality of input/output pins, by the Rn/B-pin selection block 160.

As also illustrated in FIG. 4, the ready/busy signals Rn/B of the memory chips, which may be held in the output buffers 110, may be output therefrom in response to toggling operations of the output-enable signal nRE. In detail, status data SD_0, SD_1, . . . , and SD_k (SD_1~SD_k) corresponding to the ready/busy signals Rn/B of the memory chips may be output to the input/output pins I/O<x>, which may be assigned thereto in the memory chips, in response to rising edges of the output-enable signal nRE. Here, the toggling number of the output-enable signal nRE may be dependent on the control pattern of the memory chips. In this embodiment, the ready/busy signals Rn/B of 8 bits output first to the input/ output pins may correspond with a configuration where the number of the memory chips included in the multi-chip flash memory device is 8 and the number of the input/output pins is I/O<7:0> is 8. In this case, each of the 8 data bits, which may be output to the input/output pin by a one-time toggling operation of the output-enable signal nRE, may correspond with the ready/busy signal of one memory chip. Additionally, these ready/busy signals Rn/B may be provided to the host or the memory controller 60 and may continue to be output in predetermined times in response to the toggling operations of the output-enable signal nRE.

According to the output pattern of the ready/busy signal Rn/B, shown in FIG. 4, the multi-chip flash memory device may be able to check the internal operation status of all memory chips at the same time from the one-time input request command G0h. In addition, it may be possible for the memory controller 60 or the host to communicate the status of the multi-chip flash memory device in a short time by using the ready/busy signals Rn/B that may be output to the different input/output pins in response to the one-time status request command. The memory controller 60 or the host may be able to select a memory chip that is ready to be programmed, during a programming operation with a large capacity of data, with greater speed, by determining the internal operation states of multiple memory chips simultaneously. Since the memory controller 60 or the host may be able to check the internal status of the memory chips, select one of the memory chips, and conduct a programming operation to the selected memory chip, with greater speed, the standby time for receiving the ready/busy signals Rn/B may be shortened.

Figure 5:
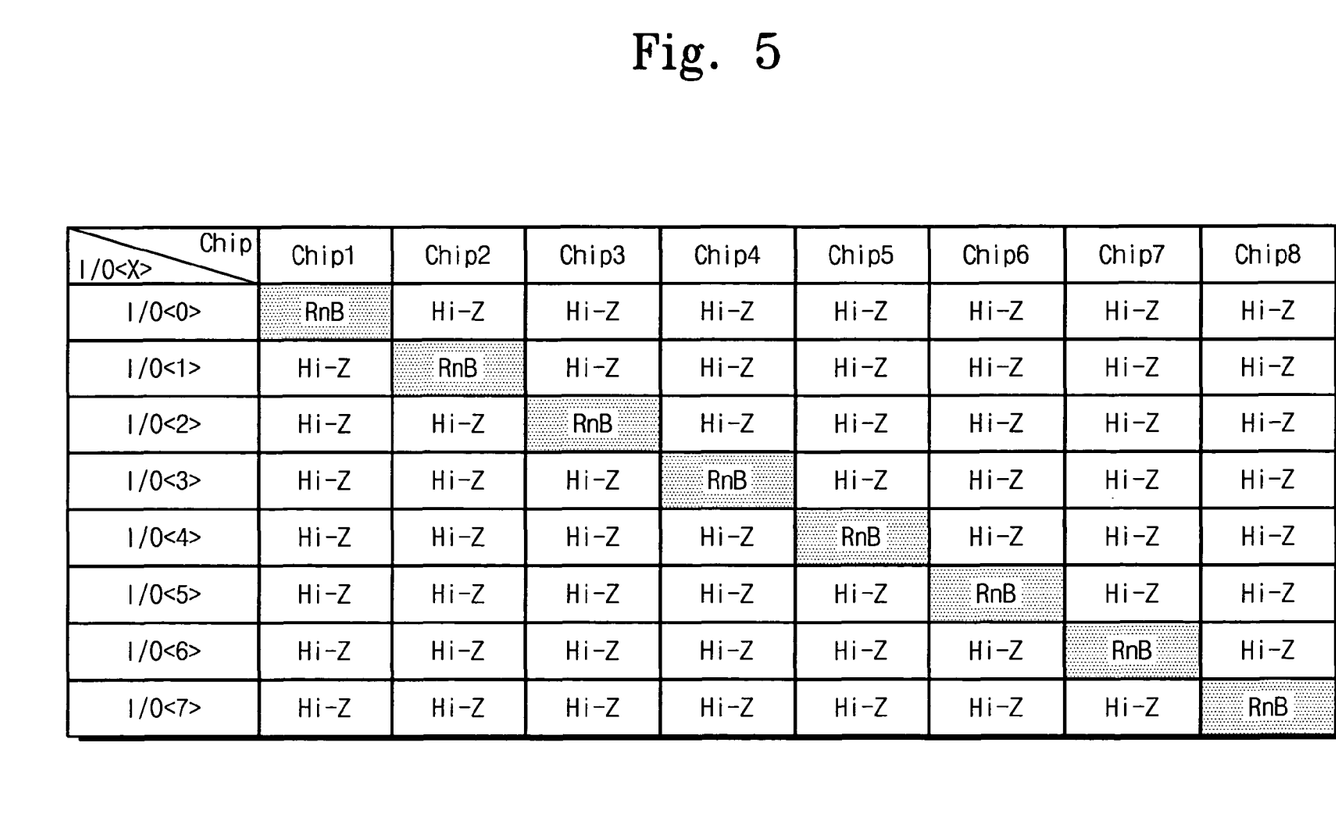
FIG. 5 shows an example allocation pattern of the ready/busy signal to the memory chips.

FIG. 5 is a table showing an example of the assignment of the status data SD_0~SD_k of the ready/busy signals of the multi-chip flash memory device, as shown in FIG. 4, to the input/output pins. Referring to FIG. 5, the assignment of the ready/busy signals Rn/B to the input/output pins I/O<x> is shown with the arrangement of the input/output pins I/O<7:0> in the memory chips 20~40 (Chip1~Chip 8).

Chip1 may output the ready/busy signal Rn/B to the input/output pin I/O<0> which may be assigned thereto by the Rn/B-pin selection block 160. Chip1 may output the ready/busy signal Rn/B through the input/output pin I/O<0> in response to the output-enable signal nRE. The rest of the input/output pins I/O<7:1> may be held on high impedance (High-Z) states. In each memory chip, the rest of input/output pins, except the input/output pin for the ready/busy signal Rn/B, may all be conditioned in the high impedance state. This may prevent memory chips from outputting a ready/busy signal Rn/B through a pin assigned to another chip. For instance, the input/output pin I/O<4> may be used as an output terminal for the ready/busy signal Rn/B of Chip5. Thus, each of the memory chips, excluding Chip5, may maintain the input/output pins I/O<4> on the high impedance state, which may make the ready/busy signal Rn/B of Chip5 output in a normal level. The assignment pattern with the input/output pins through which the ready/busy signals Rn/B of Chip2 to Chip7 may be output may be configured in sequential arrangement as shown in FIG. 5. It should be noted that particular pin assignments shown in FIG. 5 are just an example, other arrangements may be possible. In summary, according to at least one example embodiment, different input/output pins I/O<x> may be assigned to different memory chips which may allow the individual ready/busy signals Rn/B from the different memory chips to be distinguished from one another externally.

Assigning the ready/busy signals Rn/B of the different memory chips to different input/output pins I/O<x> may allow the multi-chip flash memory device, according to at least one example embodiment, to determine the internal operation status all of the memory chips at the same time.

Figure 6:
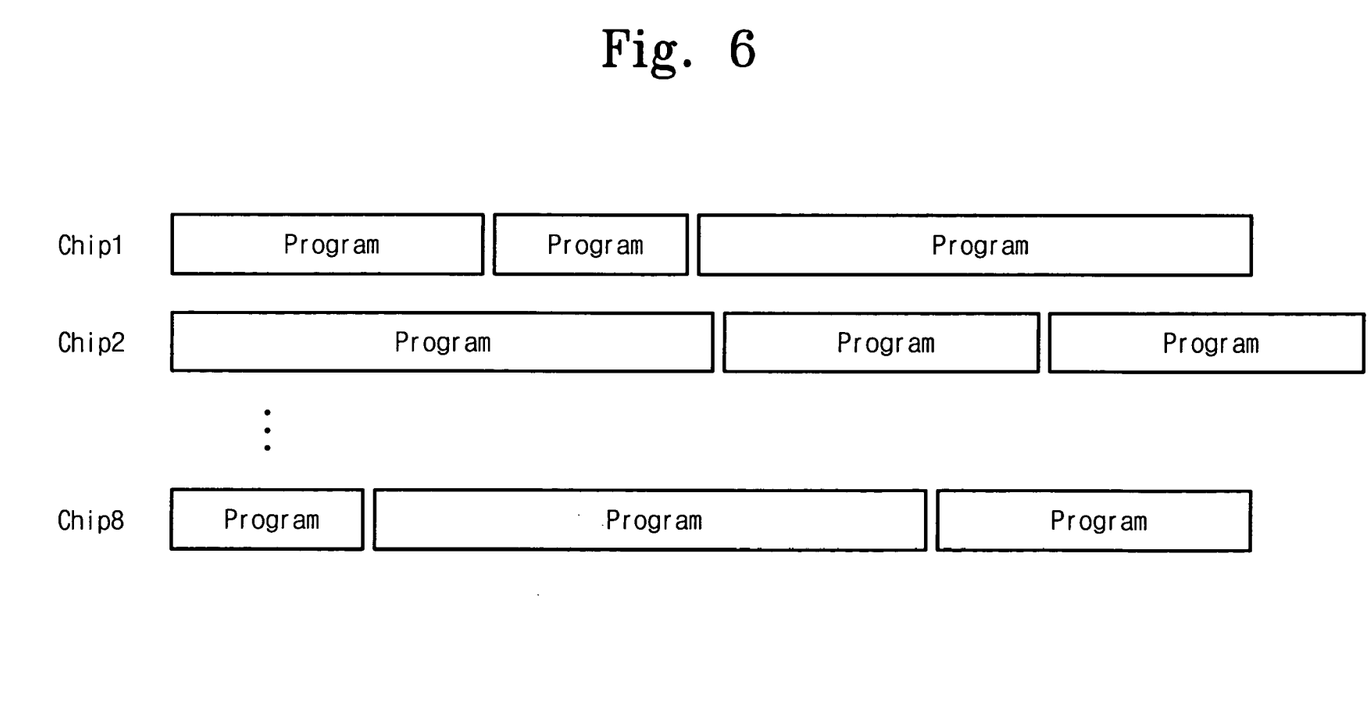
FIG. 6 is a timing diagram showing an interleaved programming operation of the multi-chip flash memory device in accordance with at least one example embodiment.

FIG. 6 is a timing diagram showing an interleaved programming operation of the multi-chip flash memory device in accordance with at least one example embodiment, as a way of outputting the ready/busy signals Rn/B. Referring to FIG. 6, the host or the memory controller 60 may be able to check the internal operation status of the memory chips with greater speed using the output pattern of the ready/busy signals Rn/B. Further, the host or the memory controller 60 may be able to promptly supply program data to a writable memory chip from sensing a memory chip that has been programmed. Owing to this operation, the host or memory controller may be able to find a programmable memory chip with greater speed even during the interleaved programming operation where the memory chips may be being programmed successively. Since program data may be promptly supplied to a memory chip that is completed in programming, it may be possible to shorten a time interval between the successive programming operations. Therefore, according to at least one example embodiment, the output method of the ready/busy signals Rn/B may be useful in enhancing an interleaved operation rate where programming a large capacity of continuously supplied data.

Figure 7:
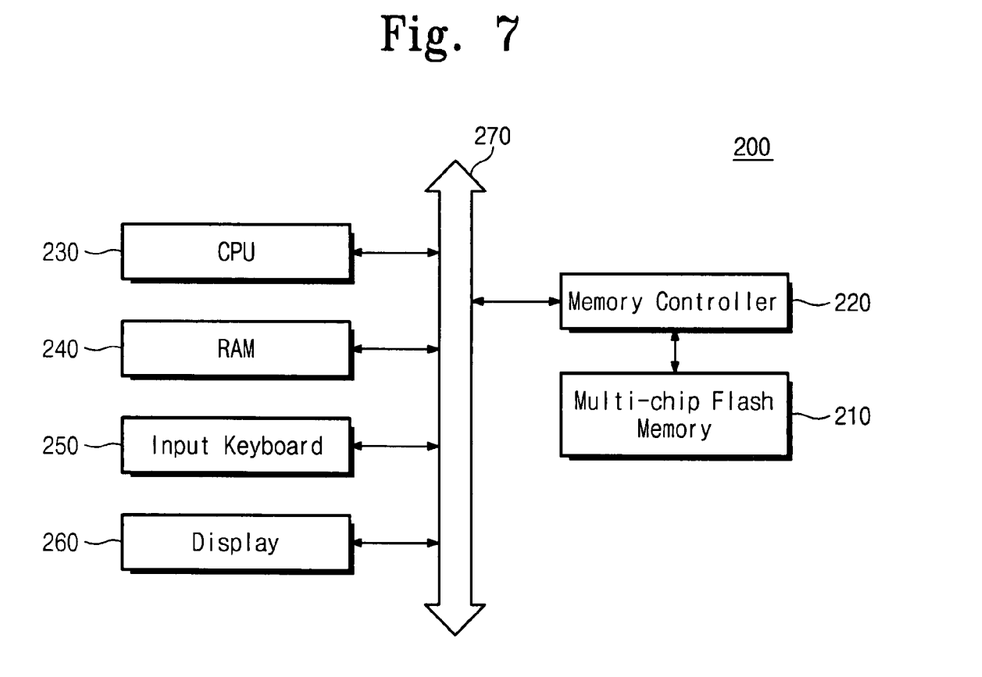
FIG. 7 is a block diagram showing a system including the multi-chip flash memory device in accordance with at least one example embodiment.

FIG. 7 is a block diagram showing a system including the multi-chip flash memory device in accordance with at least one example embodiment. Referring to FIG. 7, the multi-chip flash memory device 210 according to at least one example embodiment may be embedded in a system, for example, a mobile apparatus or a desktop computer. The system according to at least one example embodiment may be comprised of a central processing unit (CPU) 230, a random access memory (RAM) 240, an input keyboard 250, a memory controller 220, and a flash memory device 210, all of which may be electrically connected to a bus 270. The flash memory device 210 may be formed in the same feature with the aforementioned multi-chip flash memory device in substance. The multi-chip flash memory device 210 may store data that may be input by the keyboard 250 or processed by the CPU 230 through the memory controller 220. Here, the multi-chip flash memory device 210 and the memory controller 220 are illustrated as being independent to each other, whereas the memory controller 220 may be included in the multi-chip flash memory device 210. If the system shown in FIG. 7 is a mobile system, a battery (not shown) may be further provided to supply a driving voltage of the system. Although not shown, the system shown in FIG. 7 may further comprise an application chipset, or a camera image processor.

According to at least one example embodiment of the multi-chip flash memory device, since even the one-time command input may enable the internal operation status of all memory chips to be provided simultaneously, and thus, with greater speed, the operation rate of the multi-chip flash memory device may be improved.

The above-disclosed subject matter is to be considered illustrative, and not restrictive, and the appended claims are intended to cover all such modifications, enhancements, and other embodiments, which fall within the true spirit and scope of the example embodiments. Thus, to the maximum extent allowed by law, the scope of the example embodiments is to be determined by the broadest permissible interpretation of the following claims and their equivalents, and shall not be restricted or limited by the foregoing detailed description.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method for reading status data from a multi-chip memory device including a plurality of memory chips, comprising:
providing a command to request an output of the status data to each of the plurality of memory chips; and
accepting the status data of each of the plurality of memory chips through multiple channels of the multi-chip memory device,
wherein for each of the plurality of memory chips, the status data of the memory chip is accepted through at least one channel, from among the multiple channels, exclusively assigned to the memory chip, and the status data for all the plurality of memory chips is accepted simultaneously.

2. The method as set forth in claim 1, wherein the plurality of memory chips share the channels of the multi-chip memory device.

3. The method as set forth in claim 2, wherein the plurality of memory chips output the status data through the multiple channels in parallel.

4. The method as set forth in claim 1, wherein the status data are ready/busy signals.

5. The method as set forth in claim 1, wherein the plurality of memory chips output the status data in parallel.

6. The method as set forth in claim 1, wherein the plurality of memory chips output the status data through input/output pins that are electrically connected to the channels.

7. The method as set forth in claim 1, wherein while accepting the status data of the plurality of memory chips through the multiple channels of the multi-chip memory device, the status data are output in response to an output-enable signal.

8. The method as set forth in claim 1, wherein the channels are an internal data bus of the multi-chip memory device.

9. A method for reading status data from a multi-chip memory device including a plurality of memory chips, comprising:
setting the plurality of memory chips to output status data through different channels of the multi-chip memory device, each of the plurality of memory chips outputting status data through at least one channel, from among the different channels, exclusively assigned to each of the memory chips, respectively;
providing a command to request an output of the status data to the plurality of memory chips; and
accepting the status data of all the plurality of memory chips simultaneously through the different channels in parallel.

10. The method as set forth in claim 9, wherein the channels through which the status data are output are selected by one from the group of:
bonding options, fuse programming or a combination of the two.

* * * * *